United States Patent
Yamamoto et al.

(10) Patent No.: US 9,274,021 B2
(45) Date of Patent: Mar. 1, 2016

(54) LEAKAGE INSPECTION APPARATUS AND LEAKAGE INSPECTION METHOD

(75) Inventors: Setsuo Yamamoto, Ube (JP); Hiroki Kurisu, Ube (JP); Naoki Takada, Ube (JP); Mitsugu Nakagawa, Obu (JP); Katsushi Tsuge, Obu (JP); Yukihiro Ishikawa, Obu (JP)

(73) Assignees: YAMAGUCHI UNIVERSITY, Yamaguchi-shi (JP); MARUNAKA CO., LTD., Obu-shi (JP)

( * ) Notice: Subject to any disclaimer, the term of this patent is extended or adjusted under 35 U.S.C. 154(b) by 607 days.

(21) Appl. No.: 13/808,226

(22) PCT Filed: Jul. 1, 2011

(86) PCT No.: PCT/JP2011/065222
§ 371 (c)(1),
(2), (4) Date: Apr. 26, 2013

(87) PCT Pub. No.: WO2012/005199
PCT Pub. Date: Jan. 12, 2012

(65) Prior Publication Data
US 2013/0199274 A1      Aug. 8, 2013

(30) Foreign Application Priority Data

Jul. 5, 2010   (JP) .................................. 2010-153217

(51) Int. Cl.
G01M 3/20 (2006.01)
G01M 3/22 (2006.01)
G01M 3/32 (2006.01)

(52) U.S. Cl.
CPC ................ G01M 3/20 (2013.01); G01M 3/229 (2013.01); G01M 3/3281 (2013.01)

(58) Field of Classification Search
CPC ...... G01M 3/229; G01M 3/3281; G01M 3/20
USPC .................. 73/40.7, 45.4, 49.3, 52
See application file for complete search history.

(56) References Cited

U.S. PATENT DOCUMENTS

| | | | | |
|---|---|---|---|---|
| 5,303,576 A | * | 4/1994 | Erdelsky | G01M 3/363 337/321 |
| 5,369,983 A | * | 12/1994 | Grenfell | G01M 3/229 73/40.7 |
| 5,907,093 A | | 5/1999 | Lehmann | |
| 7,707,871 B2 | * | 5/2010 | Lukens | G01M 3/229 73/40.7 |

(Continued)

FOREIGN PATENT DOCUMENTS

| | | |
|---|---|---|
| JP | 05-296871 A | 11/1993 |
| JP | 11-281515 A | 10/1999 |

(Continued)

OTHER PUBLICATIONS

International Search Report of PCT/JP2011/065222, mailing date of Sep. 13, 2011.

*Primary Examiner* — John Fitzgerald
*Assistant Examiner* — Marrit Eyassu
(74) *Attorney, Agent, or Firm* — Westerman, Hattori, Daniels & Adrian, LLP

(57) ABSTRACT

Provided are a leakage inspection apparatus and a leakage inspection method for inspecting the flow rate of leakage from a tested body disposed in a tested-body chamber 21. The leakage inspection apparatus includes liquid supplying and pressurizing means 11 for supplying a probe liquid to the inside of the tested-body chamber 21 and pressurizing the probe liquid to a high pressure 0.1 MPa or more, vacuum evacuation means 22-b, 23-b and a quadrupole mass spectrometer 34. The tested body 21 is evacuated, the probe liquid is supplied to the inside of the tested body and pressurized to 0.1 MPa or more and the concentration of a probe medium leaked from the tested body and evaporated in a vacuum is measured by the quadrupole mass spectrometer 34, thereby measuring the flow rate of leakage from the tested body. This makes it possible to determine the flow rate of leakage using a liquid as a probe medium and simultaneously possible to perform a pressure tightness inspection at an atmospheric pressure of 0.1 MPa or more, especially at a high pressure ranging from 1 MPa to 1 GPa.

12 Claims, 4 Drawing Sheets

(56) References Cited

U.S. PATENT DOCUMENTS

2010/0326173 A1* 12/2010 Abrahamsen ......... G01M 3/363
                                                           73/49.3
2011/0113861 A1*  5/2011 Maehira ................ G01M 3/205
                                                           73/40.7

FOREIGN PATENT DOCUMENTS

| JP | 2003-185520 A | 7/2003 |
| JP | 2005-140504 A | 6/2005 |
| JP | 2007-316084 A | 12/2007 |

* cited by examiner

LEAKAGE INSPECTION APPARATUS AND LEAKAGE INSPECTION METHOD

FIELD OF THE INVENTION

The present invention relates to a leakage inspection apparatus and leakage inspection method applied for various kinds of consumer and industrial parts such as automotive parts, aircraft parts, etc. and packages. The apparatus and the method are provided to quantitatively inspect leakage caused in the structures, per se, of the above items, defects of joint portions or seal portions formed by welding, etc.

BACKGROUND OF THE INVENTION

For various pants of automobiles and airplanes, various parts structuring gas facilities or water facilities and packages for foods, medical products, etc., it is necessary to inspect leakage caused in the structures, per se, of these items and defects of joint portions and seal portions formed by welding, etc., thereof. Leakage inspection methods have been used, which are illustrated in Table 1, that is, "pressurization foaming method", "in-water foaming method", "color check method", "ultrasonic method", "differential pressure method", "gas leak test method", and the like.

TABLE 1

Detection Principle and Quantitativity of Leakage Inspection Method

| Name | Detection principle | Quantitativity |
|---|---|---|
| Pressurization foaming method | Soap water is applied on the outside of a specimen and the inside is pressurized with gas (air). Bubbles generated from a leak portion are detected. | x |
| In-water foaming method | A specimen is soaked in water and the inside of the specimen is pressurized with gas (air). Bubbles generated from a leak portion are detected. | x |
| Color check method | A color solvent is applied on a specimen. The solvent is absorbed at a leak portion and appeared as a maculation and the maculation is detected. | x |
| Ultrasonic method | When there is leakage continuously, ultrasonic waves are generated. The ultrasonic waves are detected with an ultrasonic sensor. | x |
| Differential pressure method | A specimen and a standard body (master) are pressurized with air in order to detect a differential pressure between the specimen exhibiting leakage and the master exhibiting no leakage. | o |
| Gas leak test method | A specimen is entered into a vacuum chamber and the inside of the specimen is pressurized with a probe gas. Probe gas having leaked is detected. Helium gas is often used as the probe gas. | o |

Oil production sites for various parts and packages, a leakage inspection by taking products that exhibit a flow rate of leakage below a permitted rate as acceptable products has been a mainstream method. On this background, methods as represented by "differential pressure method" and "gas leak test method", which enable determination of a flow rate of leakage, have been employed widely.

For example, a leakage inspection apparatus of a differential pressure method is disclosed in Japanese Patent Application Laid-open No. H5-296871 (Patent Document 1) and a helium gas leak detection apparatus of a gas leak test method is disclosed in Japanese Patent Application Laid-open No. 2005-140504 (Patent Document 2).

FIG. 3 illustrates a diagrammatic view of a leakage inspection according to a differential pressure method, which is a conventional technique. In the differential pressure method, a tested body and a master from which no leakage occurs are pressurized with a gas, a valve of a pressurization line is closed and thereafter the pressure difference $\Delta P$ (Pa) between the tested body and the master is measured after a constant time $\Delta t$ (s). Supposing the volume inside the tested body is V ($m^3$), the flow rate Q ($Pam^3s^{-1}$) of leakage can be estimated, by $Q=V(\Delta P/\Delta t)$. Since the detection resolution (detection lower limit) of the leakage inspection apparatus using the differential pressure method is about $10^{-4}$ $Pam^3s^{-1}$, the method has been mainly used for inspection for parts whose allowable flow rate of leakage is $10^{-3}$ $Pam^3s^{-1}$ or more.

FIG. 4 is a diagrammatic view illustrating a gas leak test method, which is another conventional technique. A high pressure probe gas of about 0.5 MPa is filled in a tested body. The tested body is disposed in a vacuum chamber and, when there is a leakage, the probe gas leaking into the vacuum chamber is detected with a gas detector. Herein, a calibration leak providing a known flow rate of leakage is equipped in the gas detector, allowing the flow rate of leakage ($Pam^3s^{-1}$) to be measured.

Helium gas is mainly used for the probe gas and, since the detection resolution of the helium detector (helium leak detector) is about $10^{-10}$ $Pam^3s^{-1}$, the gas leak test method has been mainly used for inspecting parts whose minute allowable flow rate of leakage is $10^{-3}$ $Pam^3s^{-1}$ or less. Note that the gas leak test method in which helium gas is used as a probe gas is called helium leak test method.

SUMMARY OF THE INVENTION

Improvement in high precision and high pressure tightness has been advanced for various kinds of parts of consumer or industrial machineries and packages or containers. Therefore, establishment of a method for inspecting a minute leakage also serving as a high pressure tightness inspection has been an urgent problem.

When it is necessary to pressurise the probe medium to 1 MPa or more in "a differential pressure method" and "a gas leak test method" in which a gas is used as a probe medium, it is required that the leakage inspection apparatus is equipped, with security facilities in order to satisfy the specification to prevent bursting based on High Pressure Gas Safety Act for security. This causes a considerable apparatus cost increase in comparison with the conventional apparatus and also a problem that regulations to the apparatus itself and regulations to the surrounding environment are imposed to make it very difficult, to handle the method.

In the differential pressure method, high-pressure gas is supplied to the insides of a tested body and a master and thereafter valves are closed for inspection. Alternatively, a leakage inspection method using a liquid as a probe medium may be considered. In this case, pressure fluctuation due to closing of the valves is large and sensitive properties of a differential pressure sensor which is a mechanism for measuring the change of capacitance due to deformation of a diaphragm are largely changed due to using of liquid. Accordingly, it is difficult to use a liquid as a probe medium in the leakage inspection.

The present invention has been conceived in light of the problems of the above-mentioned conventional method. An object of the present invention is to provide a leakage inspection apparatus and a leakage inspection method which make it possible to quantify flow rate of leakage using liquid as a probe medium and to inspect pressure tightness at 0.1 MPa of atmospheric pressure or more, especially of a high pressure ranging from 1 MPa to 1 GPa simultaneously.

A leakage inspection apparatus according to the present invention is an apparatus for inspecting a flow rate of leakage from a tested body, in which the apparatus comprises a tested-body chamber for disposing the tested body therein, the tested-body chamber being able to be sealed; liquid supplying and pressurizing means that can be connected to the tested body disposed in the tested-body chamber, the liquid supplying and pressurizing means supplying a probe liquid to the inside of the tested body and pressurizing the probe liquid; vacuum evacuation means; and a mass spectrometer connected to the tested-body chamber. The leakage inspection apparatus is characterised in that the tested-body chamber is evacuated by the vacuum evacuation means in a state where the tested-body chamber is sealed, the probe liquid is supplied to the inside of the tested body and pressurized to be 0.1 MPa or more, with the tested body being connected to the liquid supplying and pressurizing means and sealed, and the concentration of a probe medium having leaked from the tested body and having been evaporated in a vacuum is measured by the mass spectrometer, thereby measuring the flow rate of leakage from the tested body.

The leakage inspection apparatus according to the present invention is characterized by further including a probe liquid standard leakage for supplying a probe liquid to the tested-body chamber at a known flow rate of leakage.

The leakage inspection apparatus according to the present invention is further characterized in that two or more systems of vacuum evacuation means are connected to the tested-body chamber via a vacuum valve.

The leakage inspection apparatus according to the present invention is further characterized in that a vacuum gauge for measuring a degree of vacuum (pressure) in the tested-body chamber and the vacuum evacuation means are connected to the tested-body chamber, an inspection chamber is connected to the tested-body chamber via a vacuum valve and a mass spectrometer for measuring the concentration of the probe medium and vacuum evacuation means are connected to the inspection chamber.

The leakage inspection apparatus according to the present invention is further characterised in that a liquid having a molecular mass of 500 or less, a solidification pressure of 1 MPa or more at a room temperature, an equilibrium vapor pressure of 100 Pa or more and an evaporative latent heat of 80 kJ·mol$^{-1}$ or less is used as the probe liquid.

The leakage inspection apparatus according to the present invention is further characterised in that a probe medium in which a gas is dissolved in a solvent liquid is used as the probe liquid, the solvent liquid having a molecular mass of 500 or less, a solidification pressure of 1 MPa or more at a room temperature, an equilibrium, vapor pressure of 100 Pa or more.

A leakage inspection method according to the present invention is a method for inspecting a flow rate of leakage from a tested body disposed in a tested-body chamber that can be sealed and that can be evacuated by vacuum evacuation means. The leakage inspection method is characterised by comprising: disposing the tested body in the tested-body chamber in a state where the tested body is connected to liquid supplying and pressurizing means and sealed; evacuating the tested-body chamber by the vacuum evacuation means in a state where the tested-body chamber is sealed; supplying a probe liquid to the inside of the tested body disposed in the tested-body chamber and pressurizing the probe liquid to be 0.1 MPa or more by the liquid supplying and pressurizing means; and measuring the concentration of a prove medium having leaked from the tested body and having been evaporated in a vacuum with a mass spectrometer, thereby measuring the flow rate of leakage from the tested body.

The leakage inspection method according to the present invention is further characterised in that a probe liquid is supplied to the tested-body chamber at a known flow rate of leakage with a probe liquid standard leakage.

The leakage inspection method according to the present invention is further characterised in that two or more systems of vacuum evacuation means are connected to the tested-body chamber via a vacuum valve.

The leakage inspection method according to the present invention is further characterized in that a vacuum, gauge for measuring a degree of vacuum (pressure) in the tested-body chamber and the vacuum evacuation means are connected to the tested-body chamber, an inspection chamber is connected to the tested-body chamber via a vacuum valve and a mass spectrometer for measuring the concentration of the probe medium and vacuum evacuation means are connected to the inspection chamber to be used.

The leakage inspection method, according to the present invention is further characterised in that a liquid having a molecular mass of 500 or less, a solidification pressure of 1 MPa or more at a room temperature, an equilibrium vapor pressure of 100 Pa or more and an evaporative latent heat of 80 kJ·mol$^{-1}$ or less is used as the probe liquid.

The leakage inspection method according to the present invention is further characterised in that a probe medium in which a gas is dissolved in a solvent liquid is used as the probe liquid, the solvent liquid having a molecular mass of 500 or less, a solidification pressure of 1 MPa or more at a room temperature and an equilibrium vapor pressure of 100 Pa or more.

According to the leakage inspection apparatus and the leakage inspection method according to the present invention in which a liquid is used as a probe medium, a probe liquid of a high pressure is supplied to the inside of the tested body which is in a sealed state and disposed in the tested body chamber which is evacuated and the concentration of the probe medium having leaked and having been evaporated in the vacuum is measured with a mass spectrometer, which makes it possible to perform an inspection of a minute flow rate of leakage and an inspection of pressure tightness simultaneously within a short time. Furthermore, security facilities with respect to high pressure gas, which must be equipped, e.g., in a leakage inspection using a gaseous probe medium, are unnecessary.

DETAILED DESCRIPTION OF THE PREFERRED EMBODIMENTS

Figure 1:
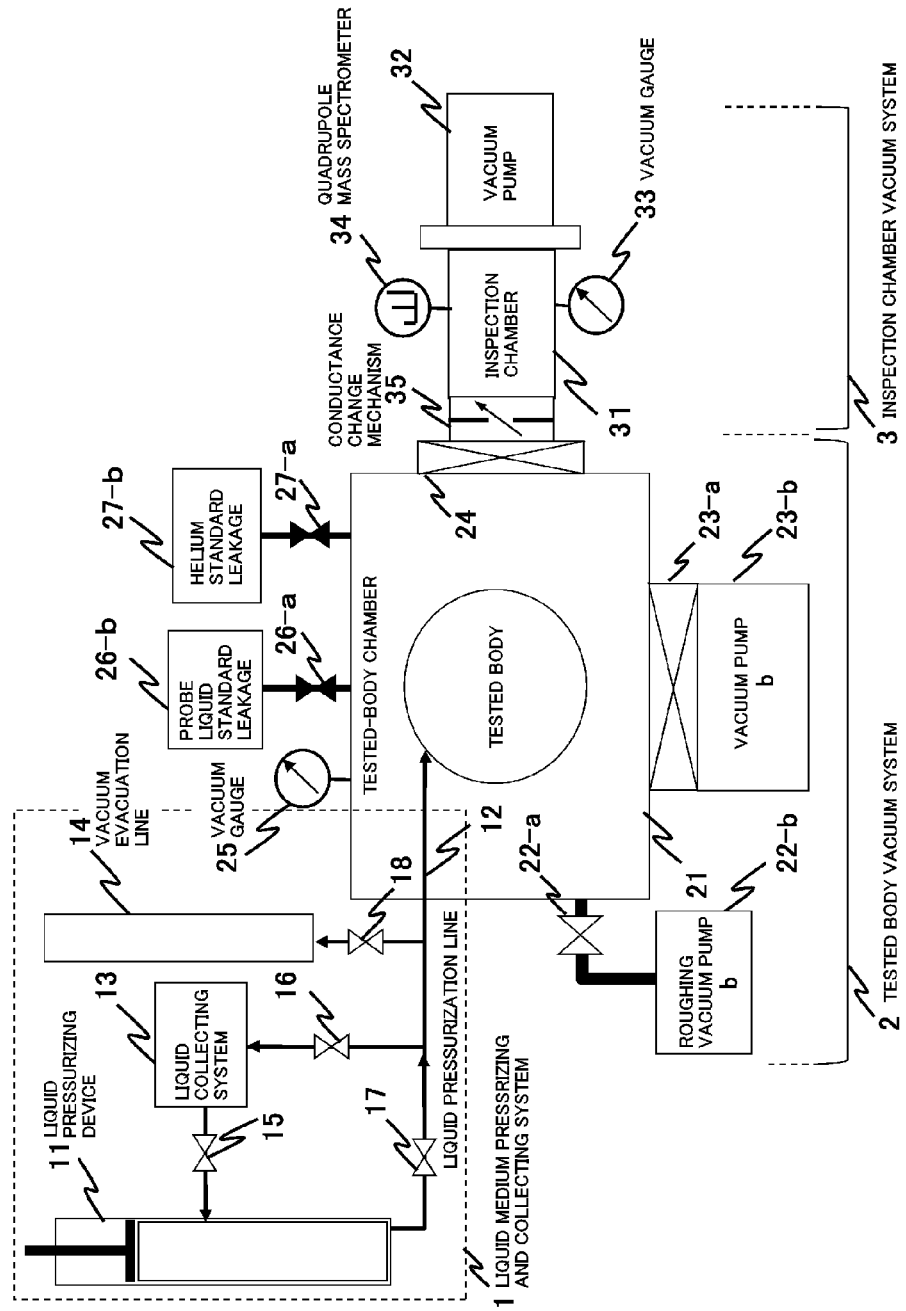
FIG. 1 is a diagrammatic view illustrating a composition of a liquid leakage inspection apparatus of according to an embodiment of the present invention.

Hereinafter, an example of an embodiment of a leakage inspection apparatus and a leakage inspection method, in which liquid is used as a probe medium, according to the present invention will be explained with reference to the drawings. FIG. 1 is a diagrammatic view illustrating the composition of a leakage inspection apparatus for performing leakage inspection in which liquid is used as a probe medium in the embodiment. The apparatus includes a liquid medium pressurizing and collecting system 1, a tested body vacuum system 3 and an inspection chamber vacuum system 3.

The liquid medium pressurizing and collecting system 1 is a device that supplies a probe liquid to the inside of a tested body via a liquid pressurization line 12 with the liquid supplying and pressurizing apparatus 11 and pressurises the probe liquid to a pressure from 0.1 MPa (atmospheric pressure) to 1 GPa. The system includes a liquid supplying and pressurizing device 11, a liquid pressurization line 12 for supplying the pressurized liquid to the inside of the tested body, a collecting system 13 for collecting the probe liquid remaining in the tested body and the liquid pressurization line 12 after finishing inspection and a vacuum evacuation line 14 for eliminating the probe liquid remaining after the collection and the air introduced for collecting the remaining probe liquid and valves 15 to 18.

The tested body vacuum system 2 is a device for attaining vacuum, for performing leakage inspection within a short time. The system includes a tested-body chamber 21 for containing a tested body, a roughing vacuum pump 22-b for attaining medium vacuum from atmospheric pressure, a vacuum pump 23-b for attaining high vacuum from medium vacuum, vacuum valves 22-a, 23-a for connecting the tested-body chamber and respective vacuum pumps, a vacuum valve 24 for connecting the tested-body chamber and an inspection chamber 31, a vacuum gauge 25 for examining degree of vacuum (pressure) in the tested-body chamber, a probe liquid standard leakage 26b for quantifying leakage via a vacuum valve 26-a and a helium standard leakage 27-b for performing calibration, of sensitivity change due to aging variation of a mass spectrometer via a vacuum valve 27-a. The liquid pressurization line 12 of the liquid medium pressurizing and collecting system 1 is connected to the tested body disposed in the tested-body chamber 21 and supplies pressurized liquid into the tested body. Note that a time required for vacuum evacuation can be considerably shortened by providing the roughing vacuum pump 22-b.

The inspection chamber vacuum system 3 is a device for inspecting a leakage from the tested body. The system includes the inspection chamber 31, a vacuum pump 32 for keeping the inspection chamber at a high vacuum, a vacuum gauge 33 for examining the degree of vacuum (pressure), a quadrupole mass spectrometer 34 as a mass spectrometer for detecting leakage and a conductance change mechanism 35.

Leakage inspection in the embodiment is performed as follows. A tested body is connected to the liquid pressurization line 12, the tested body is sealed and the tested body is contained in the tested-body chamber 21 of the tested body vacuum, system 2. When a container or the like as a tested body has no sealed shape, a cover body for sealing the tested body is prepared, the liquid pressurization line 12 is connected to the cover body, and the cover body is attached to the tested body to be a sealed state. Note that there should be no leakage, in this case, at the cover body, the connecting portion to the liquid pressurization line and the attachment portion to the tested body. Then, only the vacuum valve 22-a is opened and the tested-body chamber is evacuated with the roughing vacuum pump 22-b to attain middle vacuum of about 10 Pa. Next, the vacuum valve 22-a is closed to finish the rough evacuation, only the vacuum valve 23-a is opened and vacuum, evacuation in the tested-body chamber is started with the vacuum pump 23-b.

When the tested-body chamber 21 is evacuated and the degree of vacuum (pressure) shown by the vacuum gauge 25 has reached a predetermined degree of vacuum (for example: $10^{-2}$ Pa), the vacuum valve 23-a is closed, only the valve 18 or the liquid medium pressurizing and collecting system 1 is opened and the air inside the tested body is evacuated by using the vacuum evacuation line 14, after which the valve 18 is closed, only the valve 17 is opened to supply probe liquid to the inside of the tested body and pressurize the probe liquid up to a predetermined pressure with the liquid supplying and pressurizing device 11. When there is a leakage from the tested body, the probe liquid supplied to the inside of the tested body is evaporated at a constant flow rate and leaks out info the tested-body chamber.

As for the vacuum evacuation in the tested-body chamber, after the vacuum valve 23-a is closed and evacuation performed by the vacuum pump 23-b is finished, the vacuum valve 24 is opened to perform vacuum evacuation with the vacuum pump 32. At this time, the probe medium having leaked from the tested body as a gas at a constant flow rate is led into the inspection chamber 31. The probe medium enters effectively into the quadrupole mass spectrometer 34 because the probe medium freely moves around the space.

The quadrupole mass spectrometer 34 is capable of measuring gas existing in a vacuum space for each mass-charge ratio, that is, measuring inevitably residual gas (mainly water ($H_2O$) and others such as nitrogen ($N_2$), oxygen ($O_2$), etc.) and the probe medium individually. Accordingly, the quadrupole mass spectrometer 34 measures only the concentration (partial pressure) of the probe medium having leaked out.

When the amount of leakage from the tested body is large, the degree of vacuum (pressure) shown by the vacuum gauge 33 of the inspection chamber 31 becomes higher than $10^{-2}$ Pa order and comes close to the upper limit of operation pressure of the quadrupole mass spectrometer. In this case, the conductance is reduced with the conductance change mechanism 35, the vacuum valve 23-a is opened and vacuum evacuation is also performed with the vacuum pump 23-b thereby to lower the degree of vacuum, (pressure) of the inspection chamber 31 to be $10^{-2}$ Pa or less, which makes it possible to measure flow rate of a large amount of leakage of the gas leaking from the tested body.

After finishing the leakage inspection of the tested body, the pressurization of the probe liquid is released and only the valve 16 of the liquid medium pressurizing and collecting system 1 is opened to collect the probe liquid remaining in the tested body and the liquid pressurization line 12 by means of collecting system 13, after which the valve 16 is closed. Finally, the tested-body chamber 21 is returned to the atmospheric pressure and the tested body is disconnected from the liquid pressurization line 12 and taken out from the tested-body chamber.

Next, the liquid pressurization line 12 is sealed and the above-mentioned vacuum evacuation procedure is performed, the vacuum valve 26-a is opened, the probe liquid is supplied to the tested-body chamber 21 from the probe liquid standard leakage 26-b at a known flow rate of leakage and measurement is performed with the quadrupole mass spectrometer 34. The measurement data of the probe medium having leaked from the tested body is calibrated by using the measurement data of the standard leakage and the flow rate of leakage is estimated. Furthermore, helium gas may be supplied at a known flow rate of leakage by using the helium standard leakage 27-b to calibrate the sensitivity variation due to aging of the quadrupole mass spectrometer 34. Note that, when the flow rate of leakage is small, the probe liquid, standard leakage 26-b and the helium standard leakage 21-b may be connected to the inspection chamber 31 via the vacuum valves 26-a and 27-a, respectively, instead of being connected to the tested-body chamber.

In the leakage inspection apparatus according to the invention, liquid is used as a probe medium. The liquid as the probe medium should satisfies the conditions that molecular mass is 500 or less, solidification pressure under room temperature is 1 MPa or more, equilibrium vapor pressure is 100 Pa or more and evaporative latent heat is 80 kJ·mol$^{-1}$ or less. For example, as illustrated in Table 2, the liquid includes an organic solvent having a molecular mass of 114 or less, namely, alcohols such as methanol and ethanol, ketones such as acetone, paraffins such as n-pentane, aromatic series such as benzene, and water. Note that solution in which such liquids are mixed may be used. Examples of the mixed solution include oils such as gasoline and light diesel oil which are fuel for automobiles and airplanes.

As mentioned below, ranges of physical properties of the probe liquid are determined by examining the inspection principle in the present invention.

(1) Pressurization Condition

First, in the present invention, the liquid is pressurized to be no less than atmospheric pressure of 0.1 MPa and, since the present invention is characterised in that a high pressure of 1 MPa or more is applied, it is required that the probe liquid be in a liquid state under pressure of 1 MPa or more.

(2) Estimation of Minimum Size of Leak Hole

Next, the probe liquid supplied to the inside of the tested body is required to pass through a leak hole of the tested body. Herein, the size of the leak hole is estimated in the case where a minimal leakage inspection is performed under a high pressure by using a conventional helium leak test, as described, below.

Flow rate of leakage $Q_{gas}$ (Pam$^3$s$^{-1}$) at normal temperature of 20° C. when the probe medium is a gas can be expressed as follows.

TABLE 2

Physical Properties of Candidate Materials for Probe Liquid at 25° C. (Materials having a molecular weight of 114 or less are list.)

| | | Molecular mass M | Density $\rho$ (kg·m$^{-3}$) | Coefficient of viscosity $\mu_{liq}$ (10$^{-3}$ Pa·s) | Equilibrium vapor pressure $P_{eq}$ (10$^3$ Pa) | Surface tension S (10$^{-3}$ N·m$^{-1}$) | Evaporative latent heat $E_{ev}$ (10$^3$ J·mol$^{-1}$) | $(\mu_{liq}M)/\rho$ | $\alpha^{*1}$ | $\beta^{*2}$ |
|---|---|---|---|---|---|---|---|---|---|---|
| Alcohols | Methanol | 32 | 791 | 0.54 | 16.9 | 22.5 | 38.3 | 2.18 × 10$^{-5}$ | 2.78 × 10$^8$ | 8.88 |
| | Ethanol | 46 | 789 | 1.05 | 7.89 | 22.6 | 42.6 | 6.12 × 10$^{-5}$ | 1.19 × 10$^8$ | 15.8 |
| | Isopropanol | 60 | 786 | 2.00 | 6.03 | 25.5 | 44.8 | 1.53 × 10$^{-5}$ | 4.99 × 10$^7$ | 16.5 |
| | n-propanol | 60 | 805 | 2.00 | 2.70 | 23.8 | 49.0 | 1.49 × 10$^{-5}$ | 5.43 × 10$^7$ | 40.3 |
| | n-butanol | 74 | 810 | 2.60 | 0.99 | 23.8 | 56.0 | 2.38 × 10$^{-5}$ | 3.80 × 10$^7$ | 99.9 |
| | Tertiary butanol | 74 | 779 | 3.20 | 5.60 | 20.7 | 45.0 | 3.48 × 10$^{-5}$ | 2.65 × 10$^7$ | 40.3 |
| | 2-Methyl-1-butanol | 88 | 816 | 5.10 | 0.42 | 25.5 | 38.0 | 5.50 × 10$^{-5}$ | 1.27 × 10$^7$ | 208.8 |
| | Tertiary amyl alcohol | 88 | 815 | 3.70 | 2.20 | 22.8 | 39.0 | 4.00 × 10$^{-5}$ | 2.55 × 10$^7$ | 42.9 |
| Ketones | Acetone | 58 | 790 | 0.30 | 30.6 | 22.0 | 31.1 | 2.20 × 10$^{-5}$ | 3.76 × 10$^8$ | 3.69 |
| | Methyl ethyl ketone | 72 | 805 | 0.38 | 12.1 | 24.6 | 34.0 | 3.40 × 10$^{-5}$ | 2.55 × 10$^8$ | 8.02 |
| | Diethyl ketone | 86 | 815 | 0.48 | 2.40 | 24.7 | 48.0 | 5.07 × 10$^{-5}$ | 1.88 × 10$^8$ | 37.7 |
| | Methyl-n-propyl ketone | 86 | 806 | 0.47 | 2.10 | 25.2 | 48.0 | 5.01 × 10$^{-5}$ | 1.86 × 10$^8$ | 41.7 |
| | Methyl isobutyl ketone | 100 | 800 | 0.55 | 2.90 | 25.4 | 51.0 | 6.88 × 10$^{-5}$ | 1.45 × 10$^8$ | 27.5 |
| | Methyl-n-butyl ketone | 100 | 820 | 0.58 | 0.50 | 25.2 | 39.0 | 7.07 × 10$^{-5}$ | 1.44 × 10$^8$ | 167.2 |
| Paraffins | n-pentane | 72 | 626 | 0.24 | 67.0 | 16.0 | 27.0 | 2.76 × 10$^{-5}$ | 3.54 × 10$^8$ | 1.21 |
| | n-hexane | 86 | 659 | 0.31 | 20.0 | 18.4 | 32.0 | 4.05 × 10$^{-5}$ | 2.49 × 10$^8$ | 3.86 |
| | n-heptane | 100 | 684 | 0.42 | 6.1 | 20.3 | 37.0 | 6.14 × 10$^{-5}$ | 1.70 × 10$^8$ | 11.7 |
| | n-octane | 114 | 702 | 0.54 | 1.9 | 21.8 | 40.0 | 8.77 × 10$^{-5}$ | 1.23 × 10$^8$ | 35.0 |
| Aromatics | Benzene | 78 | 873 | 0.60 | 13.0 | 28.9 | 34 | 5.36 × 10$^{-5}$ | 1.60 × 10$^8$ | 7.38 |
| | Toluene | 92 | 866 | 0.59 | 3.80 | 28.5 | 38 | 6.27 × 10$^{-5}$ | 1.49 × 10$^8$ | 23.1 |
| | O-xylene | 106 | 880 | 0.81 | 0.90 | 30.0 | 46.0 | 9.76 × 10$^{-5}$ | 1.00 × 10$^8$ | 90.3 |
| | Water | 18 | 1000 | 0.89 | 3.2 | 72.8 | 44.1 | 1.60 × 10$^{-5}$ | 1.52 × 10$^8$ | 42.3 |

$$^{*1}\alpha = \frac{\rho}{\mu_{liq}\sqrt{M} \times \left(\sqrt[3]{\frac{S}{\rho}}\right)^2},$$

$$^{*2}\beta = \frac{\rho}{P_{eq}\sqrt{M} \times \left(\sqrt[3]{\frac{S}{\rho}}\right)^2}$$

Furthermore, a mixture, in which a gas is dissolved in a liquid having a molecular mass of 500 or less, a solidification pressure at a room temperature of 1 MPa or more and an equilibrium vapor pressure of 100 Pa or more, can be used as an inspection medium. Examples of such mixture include carbonic acid water, hydrogen peroxide water and ammonia water.

[Formula 1]

$$Q_{gas} = \left[\frac{(\pi d^4)}{128\mu_{gas}}\frac{\langle P \rangle}{\Delta L}\right] \times \Delta P \; (Pam^3s^{-1}) \quad (1)$$

Herein, d is the diameter (m) of the leak hole, $\mu_{gas}$ is the coefficient of viscosity (Pa·s) of the gas, <P> is the average pressure of the gas passing through the leak hole and approximately $\langle P \rangle = \Delta P/2$, $\Delta P$ is the pressure (Pa) applied to the gas and $\Delta L$ is the length (m) of the leak hole.

Considering that allowable flow rate of leakage in leakage inspection performed by gas leak test for parts of automobiles and airplanes is about $10^{-6}$ to $10^{-5}$ Pam$^3$s$^{-1}$, it is provided that the flow rate of leakage is $Q_{gas}=1\times10^{-8}$ Pam$^3$s$^{-1}$ which is lower than that of the conventional flow rate by two digits, the applied pressure $\Delta P$ is set high: $\Delta P=1$ GPa, the length of the leak hole $\Delta L$ is set short: $\Delta L=1\times10^{-3}$ m and helium is used as the probe gas, in order to estimate the minimum size of the leak hole. From these, calculation is performed by substituting the coefficient of viscosity $\mu_{He}=1.94\times10^{-5}$ Pa·s into Formula (1). The diameter d of the leak hole can thus be estimated to be d=11.2 nm.

On the other hand, when the probe liquid used in the present invention is an organic medium and the maximum molecular mass is 500, the number of carbon elements constituting the liquid molecule is about 30 and the interatomic distance is about 0.15 nm. Therefore, it is estimated than the length of the liquid molecule be 5 nm or less. Accordingly, the probe liquid surely passes through the leak hole.

(3) Estimation of Minimum Detectable Flow Rate of Leakage

Next, the probe liquid supplied to the inside of the tested body is required to pass through the leak hole of the tested body, to be discharged into the vacuum of the tested-body chamber 21 and the inspection chamber 31 as a gas at a constant flow rate of leakage Q(Pam$^3$s$^{-1}$) and to be detected by the quadrupole mass spectrometer 34. As mentioned, below, the flow rates of leakage when, the mediums are liquid and gas respectively are compared and the minimum detectable flow rate of leakage when the probe liquid is used for the present invention is estimated. It is shown that the estimated value is of the same level as the minimum detectable flow rate of leakage in a conventional method using gas. Then, the ranges of physical properties of the probe liquid in the invention are estimated.

The flow rate of leakage $Q_{liq}$ (Pam$^3$s$^{-1}$) at a normal temperature of 20° C. when the probe medium is liquid can be expressed as follows.

[Formula 2]

$$Q_{liq} = \left[\frac{(\pi d^4)}{128\mu_{liq}} \times \frac{\Delta P}{\Delta L}\right] \times 1000 \frac{\rho}{M} \times [R \times 293] \ (Pam^3 s^{-1}) \quad (2)$$

Herein, d is diameter (m) of the leak hole, $\mu_{liq}$ is coefficient of viscosity (Pa·s) of the liquid, $\Delta P$ is pressure (Pa) applied to the liquid, $\Delta L$ is the length of the leak hole (m), $\rho$ is density of the Liquid (Kgm$^{-3}$), M is molecular weight of the liquid and R is the gas constant.

On the other hand, since the flow rate of leakage $Q_{gas}$ (Pam$^3$s$^{-1}$) can be expressed by the Formula (1), the following formula can be obtained from Formulas (1) and (2).

[Formula 3]

$$Q_{liq} = Q_{gas} \frac{1}{\langle P \rangle} \times \left(\frac{\mu_{gas}}{\mu_{liq}}\right) \times 1000 \frac{\rho}{M} \times [R \times 293] \ (Pam^3 s^{-1}) \quad (3)$$

Herein, in order to compare the flow rate of leakage of liquid and the flow rate of leakage of gas, helium gas used for the conventional helium leak test method is selected and the coefficient of viscosity $\mu_{He}=1.94\times10^{-5}$ Pa·s is substituted into the Formula (3), which is then arranged. Thus, the flow rate of leakage $Q_{liq}$ can be expressed as follows.

[Formula 4]

$$Q_{liq} = 47.4 \times Q_{Be} \frac{1}{\langle P \rangle} \times \frac{\rho}{\mu_{liq}M} \ (Pam^3 s^{-1}) \quad (4)$$

The Formula (4) means that the flow rate of leakage $Q_{liq}$ of liquid becomes $1/\langle P \rangle$ times of the flow rate of leakage $Q_{He}$ of helium gas. When $(\mu_{liq}M)/\rho$ is set to be $1\times10^{-4}$ as a representative value of $(\mu_{liq}M)/\rho$ from Table 2 and the inverse number is substituted into the Formula (4), which is then arranged, the flow rate of leakage of the probe liquid becomes as follows.

[Formula 5]

$$Q_{liq} = 4.74 \times 10^5 \frac{1}{\langle P \rangle} Q_{Be} \ (Pam^3 s^{-1}) \quad (5)$$

The flow rate of leakage $Q_{liq}$ becomes $Q_{liq}=4.74\times Q_{He}$ when, e.g., the applied pressure $\Delta P=0.2$ MPa ($\langle P \rangle =0.1$ MPa). This means that the flow rate of leakage of liquid is larger than that of gas because the density of liquid is larger than that of gas intrinsically under an applied pressure from atmospheric pressure to 1 MPa. Accordingly, it is advantageous to use a liquid in the inspection for a minute flow rate of leakage under a low applied pressure.

On the other hand, the flow rate of leak of liquid $Q_{liq}=4.73\times10^{-3}\times Q_{He}$, in the case of the applied pressure $\Delta P=200$ MPa ($\langle P \rangle=100$ MPa). This means that the flow rats of leakage of gas becomes larger than that of liquid, because the density of the gas becomes higher in proportion to the pressure under a high applied pressure.

Note that, according to Table 2, there are many liquids having a digit of $10^{-5}$ order as the value of $(\mu_{liq}M)/\rho$. Accordingly, selection of a liquid having $(\mu_{liq}M)/\rho=10^{-5}$ as a probe medium enables to perform an inspection of the flow rate of leakage with a high sensitivity, because the flow rate of leakage of a liquid medium becomes larger than that of a gas medium under an applied pressure from atmospheric pressure to 10 MPa.

In order to convert the flow rate of leakage of the probe liquid into conventional helium gas, Formula (4) is expressed as follows.

[Formula 6]

$$Q_{He} = (\equiv Q_{He,eq}) = 2.11 \times 10^{-2} \times Q_{liq} \langle P \rangle \times \frac{\mu_{liq} M}{\rho} (Pam^3 s^{-1}) \quad (6)$$

Herein, $Q_{He,eq}$ denotes the flow rate of leakage in helium equivalent.

Since the minimum detectable partial pressure of a quadrupole mass spectrometer having a high sensitivity in which an electron multiplier is used as a mass spectrometer is $10^{-13}$ Pa order, the available detectable partial pressure in the leakage inspection apparatus according to the present invention is $1\times10^{-11}$ Pa. When the effective pumping speed of the vacuum pump 32 is 0.1 m$^3$s$^{-1}$, the minimum detectable flow rate of leakage of the probe liquid is such that $Q_{liq}=1\times10^{-12}$ Pam$^3$s$^{-1}$.

When the value is substituted into Formula (6), which is then arranged, the minimum detectable flow rate of leakage of the probe liquid can be expressed with helium gas equivalent $Q_{He.eq}$ as follows.

[Formula 7]

$$Q_{He.eq} = 2.11 \times 10^{-14} \langle P \rangle \times \frac{\mu_{liq} M}{\rho} \quad (Pam^3 s^{-1}) \qquad (7)$$

Since the value of $[(\mu_{liq}M)/\rho)]$ ranges from $10^{-5}$ to $10^{-4}$ according to the physical properties of candidate materials of the probe liquid at a normal temperature of 25° C. in Table 2, taking $(\mu_{liq}M)/\rho=1\times10^{-4}$ as a representative value and the applied pressure $\Delta P=200$ MPa ($\langle P \rangle=100$ MPa), the minimum detectable flow rate of leakage of the probe liquid in the leakage inspection apparatus according to the present invention becomes $Q_{He.eq}=2.11\times10^{-10}$ $Pam^3s^{-1}$ in helium equivalent. The value is approximately the same as the minimum detectable flow rate of leakage with a helium leak detector capable of inspecting leakage with a high sensitivity. Accordingly, it is understood that the present invention enables a leakage inspection, with a sufficiently high sensitivity.

Parts of automobiles, airplanes, etc., are main objects of the inspection with the leakage inspection apparatus according to the present invention capable of inspecting pressure tightness under a high pressure and capable of quantifying flow rate of leakage. The allowable flow rate of leakage of these various parts is about $10^{-6}$ to $10^{-5}$ $Pam^3s^{-1}$ (helium gas, room temperature). Supposing the value of $[(\mu_{liq}M)/\rho]$ be $(\mu_{liq}M)/\rho=1\times10^{-4}$, the minimum detectable flow rate of leakage $Q_{He.eq}=2.11\times10^{-10}$ $Pam^3s^{-1}$ (helium gas equivalent) with the leakage inspection apparatus according to the present invention when $\Delta P=200$ MPa is smaller by four digits as compared with $1\times10^{-6}$ $Pam^3s^{-1}$. Accordingly, it is obvious that it is not necessary to set limits on the range of physical properties of the coefficient of viscosity $\mu_{liq}$ (Pa·s) and the density $\rho$ (kgm$^{-3}$) of the probe liquid.

On the other hand, as for the molecular mass M, while it is not necessary to limit the range from the consideration of the minimum detectable flow rate of leakage, it is appropriate that the molecular mass of the probe liquid is 500 or less, since the maximum mass number capable of measurement with a quadrupole mass spectrometer being used is about 400.

The high-sensitive quadrupole mass spectrometer is used which exhibits the minimum detectable partial pressure of $10^{-13}$ Pa order in order to estimate the minimum detectable flow rate of leakage in the leakage inspection method according to the present invention as mentioned above. Besides, there is a quadrupole mass spectrometer whose minimum detectable partial pressure is $1\times10^{-7}$ Pa order. When the latter is used and it is supposed that the available detectable partial pressure in the leakage inspection apparatus according to the present invention is $1\times10^{-6}$ Pa and the effective waste velocity of the vacuum pump 32 is 0.1 m$^3$s$^{-1}$, the minimum detectable flow rate of leakage of the probe liquid becomes $Q_{liq}=1\times10^{-7}$ $Pam^3s^{-1}$.

Since the value of $[(\mu_{liq}M)/\rho]$ is within the range of $10^{-5}$ to $10^{-4}$, taking the representative value of $(\mu_{liq}M)/\rho=1\times10^{-4}$, the minimum detectable flow rate of leakage when the applied pressure $\Delta P=200$ MPa becomes $Q_{He.eq}=2.11\times10^{-5}$ $Pam^3s^{-1}$ in helium gas equivalent, so that the apparatus can be fully used for leakage inspection of various parts.

Note that a certain type of quadrupole mass spectrometers whose minimum detectable partial pressure is $1\times10^{-7}$ Pa includes one whose maximum operational pressure is about 1 Pa which is higher by two digits as compared with a high sensitivity type, in the leakage inspection apparatus using such a quadrupole mass spectrometer, there are merits that inspection for a large amount of flow rate of leakage becomes possible and the time for vacuum evacuation can be shortened, since degree of vacuum (pressure) for inspection can be set higher.

Furthermore, besides the quadrupole mass spectrometer, another mass spectrometer such as a magnetic deflection mass spectrometer or a radio frequency mass spectrometer may foe used as a mass spectrometer used for detecting the probe liquid.

(4) Consideration of Dropping of Droplet

Next, the probe liquid supplied to the inside of the tested body passes through the leak hole of the tested body and is discharged into the vacuum of the tested-body chamber 21 as a gas. In this context, when the flow rate of leakage is too large, a droplet grows at the outlet of the leak hole and the droplet drops into the tested-body chamber 21 without change and thereafter is evaporated, causing intermittent evaporation. In this case, since the measurement with the quadrupole mass spectrometer 34 is disturbed, it becomes difficult to execute a quantitative measurement of the flow rate of leakage.

Therefore, taking the flow rate Q of leakage of $Q_{He}=1\times10^{-2}$ $Pam^3s^{-1}$ which is the upper limit in the conventional helium leak test method and taking applied, pressure $\Delta P$ of 0.1 MPa, the problem of dropping of a droplet is considered as below from the relation between the evaporation rate of the medium, molecular from the surface of the droplet and the flow rate of leakage of the probe liquid. Note that the reason why $\Delta P$ is set to be 0.1 MPa is that since, as the $\Delta P$ becomes lower, the leak hole becomes larger and the flow rate of leakage of the probe liquid becomes larger when the flow rate of leakage of helium gas is constant, the evaporation rate of medium molecules from the droplet surface becomes relatively smaller as compared with the flow rate of leakage and the droplet is likely to drop.

The probe liquid having passed through the leak hole forms a droplet so long as [gravity of droplet] (N)=[drag by surface tension] (N) at the outlet of the leak, hole. Accordingly, [gravity in droplet]=[drag by surface tension] can be expressed as follows.

[Formula 8]

$$\rho \frac{4\pi r^3}{3} \times g = \pi dS \quad (N) \qquad (8)$$

Herein, $\rho$ is the density (kgm$^{-3}$) of the probe liquid, r is the radius (m) of the droplet, g is the gravity acceleration (ms$^{-2}$), d is the diameter (m) of the leak hole and S is the surface tension (Nm$^{-1}$). The radius r (m) of the droplet can be expressed from Formula (8) as follows.

[Formula 9]

$$r = \sqrt[3]{\frac{3dS}{4\rho g}} \quad (m) \qquad (9)$$

Taking the flow rate $Q_{He}$ of leakage of helium gas of $1\times10^{-2}$ $Pam^3s^{-1}$, the applied pressure $\Delta P$ of 0.1 MPa and the length $\Delta L$ of the leak hole of $1\times10^{-3}$ m, the diameter d of the leak hole becomes d=19.9 µm from Formula (1). When the value and the gravity acceleration, g=9.8 ms$^{-2}$ are substituted into Formula (9), which is then ordered, the radius r (m) of the droplet can be expressed as follows,

[Formula 10]

$$r = 1.15 \times 10^{-2} \times \sqrt[3]{\frac{S}{\rho}} \quad (m) \tag{10}$$

Since the evaporation rate Γ (s$^{-1}$) of the droplet is such that [evaporation rate] (s$^{-1}$)=[outgassing intensity] (m$^{-2}$s$^{-1}$)× [droplet surface area] (m$^2$), the evaporation rate Γ can be expressed as follows.

[Formula 11]

$$\Gamma = \left(\frac{1}{4} \times \langle v \rangle \times n\right) \times 4\pi r^2 \quad (s^{-1}) \tag{11}$$

Herein, <v> is the average velocity (ms$^{-1}$) of the evaporation gas and n is the density (m$^{-3}$) of the evaporation gas, these being such as follows.

[Formula 12]

$$\langle v \rangle = 146\sqrt{\frac{T}{M}} \ (ms^{-1}), \ n = \frac{p_{eq}}{kT}(m^{-3}) \tag{12}$$

Herein, T is absolute temperature (K), M is molecular mass of the probe liquid, $P_{eq}$ is equilibrium vapor pressure (Pa) of the probe liquid k is Boltzmann constant. When Formula (12) is substituted into Formula (11), T=293 K and k=1.38×10$^{-23}$ are substituted therein, which, is then arranged, and then the unit, of the evaporation rate [s$^{-1}$] is converted into [Pam$^3$s$^{-1}$], evaporation rate Γ (Pam$^3$s$^{-1}$) of the droplet can be expressed as follows.

[Formula 13]

$$\Gamma = 7.85 \times 10^3 \times \left[\frac{p_{eq} \times r^2}{\sqrt{M}}\right] \ (Pam^3s^{-1}) \tag{13}$$

When the radius r of the droplet of Formula (10) is substituted into Formula (13), which is then arranged, the evaporation rate Γ of the droplet can be led as follows.

[Formula 14]

$$\Gamma = 1.04 \times \left[\frac{p_{eq} \times \left(\sqrt[3]{\frac{S}{\rho}}\right)^2}{\sqrt{M}}\right] \ (Pam^3s^{-1}) \tag{14}$$

On the other hand, the flow rate of leakage $Q_{liq}$ of the probe liquid when the flow rate of leakage $Q_{He}$ of helium gas is 1×10$^{-2}$ Pam$^3$s$^{-1}$ and applied pressure ΔP is 0.1 MPa can be expressed from Formula (4) as follows.

[Formula 15]

$$Q_{liq} = 9.48 \times 10^{-7} \times \frac{\rho}{\mu_{liq}M} \ (Pam^3s^{-1}) \tag{15}$$

In order to avoid dropping of the droplet, it is required that [evaporation rate of droplet]>[flow rate of leakage]. Accordingly, the following formula is obtained from Formulas (14) and (15).

[Formula 16]

$$1.04 \times \left[\frac{p_{eq} \times \left(\sqrt[3]{\frac{S}{\rho}}\right)^2}{\sqrt{M}}\right] > 9.48 \times 10^{-7} \frac{\rho}{\mu_{liq}M} \tag{16}$$

Then, the following formula is led.

[Formula 17]

$$\left[\frac{p_{eq} \times \left(\sqrt[3]{\frac{S}{\rho}}\right)^2}{\sqrt{M}}\right] > 9.11 \times 10^{-7} \frac{\rho}{\mu_{liq}M} \tag{17}$$

Since Formula (17) expresses the relationship of [evaporation rate of droplet]>[flow rate of leakage] with physical properties of the probe liquid, the physical properties of the probe liquid can be evaluated. As stated below, ranges of equilibrium vapor pressure $P_{eq}$ (Pa) and coefficient of viscosity $\mu_{liq}$ (Pa·s) which are main physical properties are considered by using Formula (17). Note that, in the case of [evaporation rate of droplet]<[flow rate of leakage], the probe liquid forms a droplet having a size so as not to drop at the outlet of the leak hole and evaporates to balance with [flow rate of leakage], so that the flow rate of leakage can be measured with the probe liquid.

When Formula (17) is transformed, in order to evaluate the equilibrium vapor pressure $P_{eq}$ (pa), the following formula is obtained.

[Formula 18]

$$p_{eq} > 9.11 \times 10^{-7} \frac{\rho}{\mu_{liq}\sqrt{M} \times \left(\sqrt[3]{\frac{S}{\rho}}\right)^2} \ (Pa) \tag{18}$$

Herein, α is defined as follows.

[Formula 19]

$$\alpha = \frac{\rho}{\mu_{liq}\sqrt{M} \times \left(\sqrt[3]{\frac{S}{\rho}}\right)^2} \tag{19}$$

Since the value of α is α=10$^8$ order for the candidate liquids of the probe medium according to Table 2, the right side of Formula (18) is 10$^2$ Pa order. On the other hand, equilibrium vapor pressure of each of the liquids is 10$^3$ Pa order or more according to Table 2. Thus, it is understood that Formula (18) is satisfied. When $\alpha=1\times10^8$ is substituted info Formula (18) as the representative value of $\alpha$, then $P_{eq}<91.1$ Pa. Accordingly, if is determined to be sufficient for the equilibrium vapor pressure $P_{eq}$ of the probe liquid to be 100 Pa or more.

When Formula (17) is transformed in order to evaluate the coefficient of viscosity $\mu_{liq}$ (Pa·s), the following formula is obtained.

[Formula 20]

$$\mu_{liq} > 9.11\times10^{-7} \times \frac{\rho}{p_{eq}\sqrt{M} \times \left(\sqrt[3]{\frac{S}{\rho}}\right)^2} \quad (\text{Pa}\cdot s) \tag{20}$$

Herein, $\beta$ is defined as follows.

[Formula 21]

$$\beta = \frac{\rho}{p_{eq}\sqrt{M} \times \left(\sqrt[3]{\frac{S}{\rho}}\right)^2} \tag{21}$$

Since the value of $\beta$ is $10^0$ to $10^1$ order in the candidate liquids for the probe medium according to Table 2, the right side of Formula (20) is $10^{-6}$ to $10^{-5}$ Pa·s order. On the other hand, the coefficient of viscosity of each of the liquids is $10^{-4}$ Pa·s order. Thus, it is understood that Formula (20) is satisfied. Generally, the coefficient of viscosity of gas is $10^{-5}$ Pa·s order, e.g., as the coefficient of viscosity of helium is $\mu_{He}=1.94\times10^{-5}$ Pa·s. Therefore, it may not be required, to set the lower limit of the coefficient of viscosity of probe liquid.

Examining other physical properties of the probe liquid, that is, molecular mass M, density $\rho$ (kgm$^{-3}$), surface tension S (Nm$^{-1}$), it is proved that, similar to the coefficient of viscosity, it is not required to set the lower limit of molecular mass, the upper limit of density and the upper limit of surface tension.

Thus far, it has been assumed that the probe liquid passes through the leak hole as liquid but, when the coefficient of viscosity is very large and the equilibrium vapor pressure is high, the probe liquid is evaporated when passing through the leak hole. In this case, the probe liquid is evaporated at the cross-sectional area of the leak hole and [evaporation rate] and [flow rate of leakage] are balanced, so that the flow rate of leakage can be measured with the probe liquid without problems.

(5) Consideration of Activation Energy for Desorption

The probe medium, having passed through the leak hole and having been discharged into a vacuum space as gas, moves around the vacuum space and collides with a vacuum chamber wall. Then, while a part thereof is reflected and moves around in the vacuum space again, another part thereof is adsorbed on the vacuum chamber wall. When the amount of the gas adsorbed on the vacuum chamber wall is large, there are problems, for example, in that the lower limit of the measurement with the quadrupole mass spectrometer is influenced when the flow rate of leakage is small or in that the probe medium remains in the inspection chamber, resulting in taking a long time before the next measurement, when the flow rate of leakage is large. Conditions of the probe medium to avoid such problems are examined as below.

Average residence time $\tau(s)$ during which gas molecules are adsorbed on the vacuum chamber wall and remain there can be described as follows.

[Formula 22]

$$\tau = \tau_0\exp\left(\frac{E_d}{RT}\right) \quad (s) \tag{22}$$

Herein, $\tau_0$ is the oscillation period of the adsorbed molecule in the direction vertical to surface and it is about $\tau_0=1\times10^{-13}$ s. $E_d$ (kJ·mol$^{-1}$) is activation energy for desorption and it is necessary energy for the gas to be desorbed, from, the surface of the vacuum chamber wall.

Figure 2:
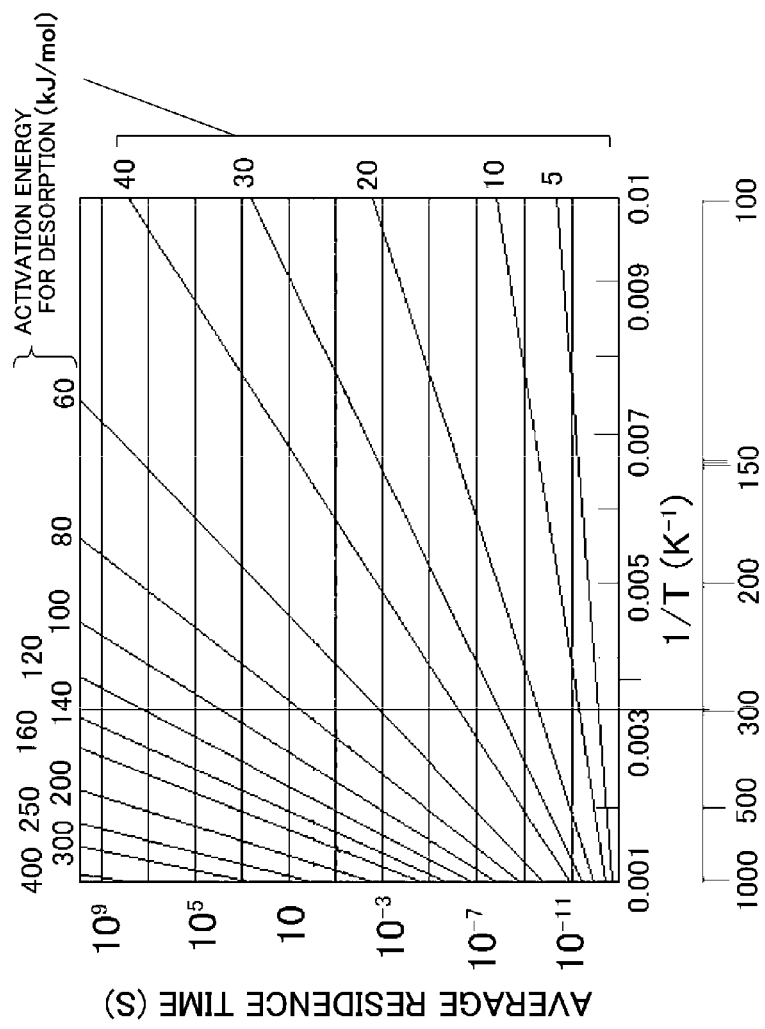
FIG. 2 is a graph snowing a relation between activation energy for desorption and average time of a gas adsorbed on a vacuum chamber wall.
Figure 3:
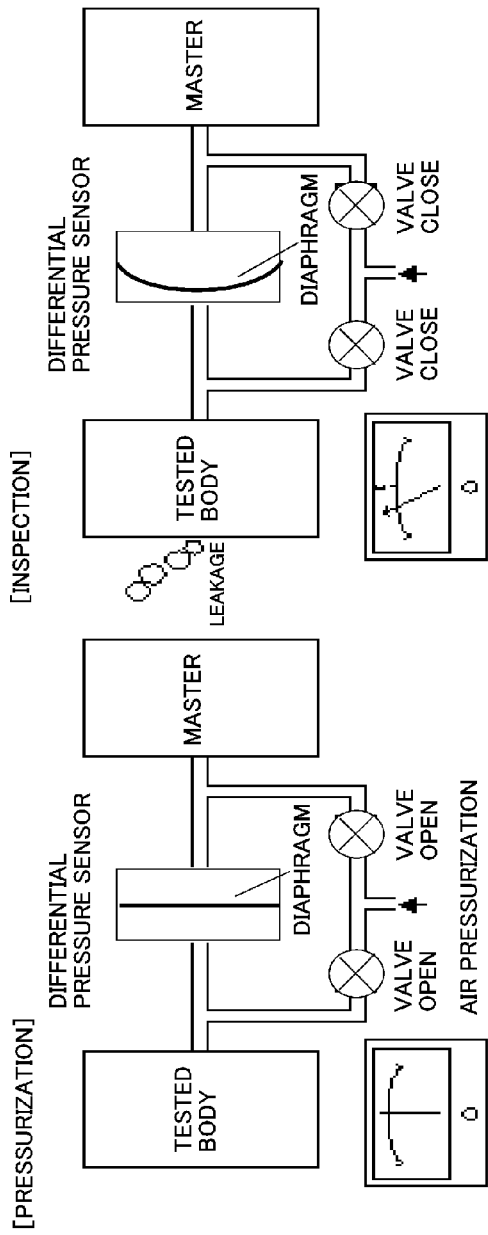
FIG. 3 is a diagrammatic view of a leakage inspection according to a differential pressure method, which is a conventional technique.
Figure 4:
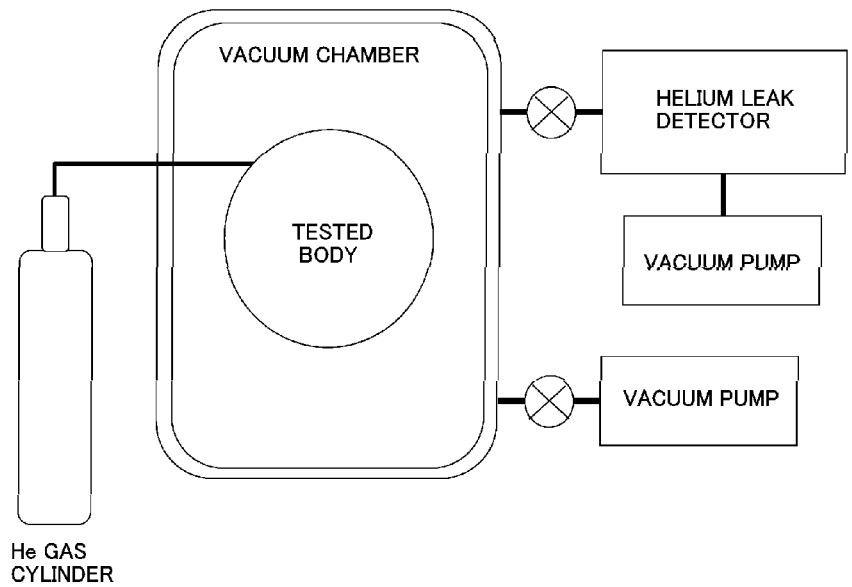
FIG. 4 is a diagrammatic view of a leakage inspection according to a helium leak test method, which is a conventional technique.

FIG. 2 illustrates the relation between, the average residence time during which gas remains on the vacuum chamber wall and the activation energy for desorption when $\tau_0-1\times10^{-13}$ s. It is understood that the average residence time $\tau(s)$ when the room temperature is 300 K is about $E_d=40$ kJ·mol$^{-1}$: $\tau=10^{-6}$ s, $E_d=60$ kJ·mol$^{-1}$: $\tau=10^{-3}$ s, $E_d=80$ kJ·mol$^{-1}$: $\tau=10^0$ s (1 s) and $E_d=100$ kJ·mol$^{-1}$: $\tau=10^4$ s.

On the other hand, the residence time (moving time) during which the probe medium having a molecular mass of M remains in the vacuum space when the distance between walls of the vacuum chamber is L=0.1 m and the room temperature is 300 K is expressed as follows.

[Formula 23]

$$t = \frac{L}{\langle v \rangle} \quad (s) \tag{23}$$

Herein, $\langle V \rangle$ can be expressed as follows.

[Formula 24]

$$\langle v \rangle = 146\sqrt{\frac{T}{M}} \quad (\text{ms}^{-1}) \tag{24}$$

When methanol having a small molecular mass is used as the probe medium, the time during which the gas remains in the vacuum space is $\tau=2.2\times10^{-4}$ s.

As described above, the minimum detectable flow rate of leakage is $Q_{He.eq}=2.11\times10^{-10}$ Pam$^3$s$^{-1}$ in helium gas equivalent with the leakage inspection apparatus according to the method of the present invention and allowable flow rate of leakage in existing various parts is $10^{-6}$ to $10^{-9}$ Pam$^3$s$^{-1}$ (helium gas, room temperature).

When inspection is performed up to $1\times10^{-6}$ Pam$^3$s$^{-1}$ in the method according to the present invention, the value is larger than the minimum detectable flow rate of leakage $10^{-10}$ Pam$^3$s$^{-1}$ by four digits. Accordingly, the average residence time during which the probe medium is adsorbed on the vacuum chamber wall may be larger than the average residence time $2.2\times10^{-4}$ s in the vacuum space by four digits. The average residence time during which the probe medium is adsorbed on the vacuum chamber wall, when the activation energy for desorption of the probe medium is 80 kJ·mol$^{-1}$, is $\tau=10^0$ s (1 s), so that it is required, that, the activation energy for desorption of the probe medium is 80 kJ·mol$^{-1}$ or less.

The activation energy for desorption is a physical amount determined by the interaction between the vaporized probe medium and the wall on which the vaporized probe medium is adsorbed. Accordingly, the activation energy for desorption is not an intrinsic physical amount of liquid which is the probe medium. The activation energy for desorption is approximately equivalent to evaporative latent heat which is a physical amount inherent to liquid. Accordingly, it is desirable for the probe liquid to have an evaporative latent heat of 80 kJ·mol$^{-1}$ or less as the necessary condition.

On the other hand, in the leakage inspection apparatus for inspecting a large number of parts, it is desired to set the inspection time as short as possible. When there is a good deal of leakage, it is necessary to evacuate the probe medium speedily. However, when the activation energy for desorption is large, the probe medium for the previous inspection remains on the vacuum chamber wall, resulting in taking a long time for being ready to perform inspection.

In order to avoid the problem, the average residence time during which the probe medium is adsorbed on the vacuum chamber wall may be $2.2 \times 10^{-4}$ s or less which is the average residence time in the vacuum space. Referring to FIG. 2, it is understood that the activation energy for desorption that satisfies the condition is about 50 kJ·mol$^{-1}$ or less. Therefore, it is desired that the evaporative latent heat of the probe medium is 50 kJ·mol$^{-1}$ or less. The evaporative latent heat of each of the candidate materials for the probe liquid shown in Table 2 at a normal tempo nature of 25° C. is 50 kJ·mol$^{-1}$ or less, satisfying the condition.

According to the above examinations, it is required for the liquid medium to be used in the present invention to have a solidification pressure of 1 MPa or more, molecular mass of 500 or less, equilibrium vapor pressure of 100 Pa or more and evaporative latent heat of 80 kJ·mol$^{-1}$ or less. Here, it is understood that each of the candidate materials for the probe liquid shown in Table 2 sufficiently satisfies the physical properties.

Working Example 1

Methanol was selected as the probe liquid in the working example 1 according to the present invention and leakage inspection was performed by using the high pressure liquid leakage inspection apparatus as shown in FIG. 1 and compared with a helium leakage inspection method according to a conventional helium leak test.

Herein, a pressurizing device capable of applying pressure up to the maximum 200 MPa was used for pressurizing liquid. A stainless-steel vacuum chamber having a size of φ200 mm×300 mm and subjected to precision chemical polishing treatment was used for the tested-body chamber 21, an oil-sealed rotary pump having a pumping speed of $1.7 \times 10^{-2}$ m$^3$s$^{-1}$ was used for the roughing vacuum pump 22-b and connected to the tested-body chamber via the vacuum valve 22-a and a turbo-molecular pump having a pumping speed of 1.0 m$^3$s$^{-1}$ is used for the vacuum pump 23-b and connected to the tested-body chamber via the vacuum valve 23-a.

A stainless-steel vacuum chamber of φ 100 mm×150 mm subjected to chemical polishing treatment was used for the inspection chamber 31 and connected to the tested-body chamber 21 via the vacuum valve 24. A turbo-molecular pump having a pumping speed of $3.0 \times 10^{-1}$ m$^3$s$^{-1}$ was used for the vacuum pump 32 of the inspection chamber 31. The conductance change mechanism 35 was inserted between the vacuum valve 24 and the inspection chamber 31 so that the conductance value can foe changed, which makes it possible to select the effective flow rate of the vacuum pump from any of $1 \times 10^{-1}$ m$^3$s$^{-1}$ and $1 \times 10^{-2}$ m$^3$s$^{-1}$.

A quadrupole mass spectrometer for a mass ranging 1 to 50, having a minimum detectable partial pressure of $1.0 \times 10^{-7}$ Pa and maximum available degree of vacuum (pressure) of 2.0 Pa, was used as the quadrupole mass spectrometer 34. A crystal ion gauge capable of measuring from $4 \times 10^{-3}$ Pa to atmospheric pressure was used for each of the vacuum gauges 25 and 33 of the tested-body chamber and the inspection chamber. A chamber having a size of φ 50 mm×50 mm and having a flange of an O-ring seal was used for the tested body and the flow rate of leakage was adjusted by slightly damaging the O-ring to change the fastening force by the flange. Note that flow rate of leakage of helium, gas from the tested body was examined by using a helium leak detector.

In the above mentioned high pressure liquid leakage inspection apparatus shown in FIG. 1, necessary time taken from vacuum evacuation to ending of the inspection was examined at first. Here, in order to shorten the necessary time, ail of the vacuum pumps of the three systems were made to be in operating states. The tested body was mounted in the tested-body chamber, the liquid pressurization line was connected to the tested body and the tested body was sealed, the tested-body chamber was sealed and thereafter only the vacuum valve 22-a was opened and vacuum evacuation was performed with the roughing vacuum pump 22-b.

The degree of vacuum (pressure) in the tested-body chamber reached the first half of 10$^2$ Pa order after 5 seconds and reached 10$^0$ Pa order after 10 seconds, from starting of the exhaust of atmospheric pressure. Next, the vacuum valve 22a was closed, the vacuum valve 23-a was opened and exhaust was started by the vacuum pump 23-b having a huge pumping speed of 1.0 m$^3$s$^{-1}$. The degree of vacuum (pressure) in the tested-body chamber reached 10$^{-3}$ Pa order or less after 45 seconds from, starting of the exhaust of atmospheric pressure.

Supply to the tested body and pressurization of the probe liquid were performed at the same time when the evacuation by the vacuum pump 23-b having a high pumping speed was started. Since the maximum available degree of vacuum (pressure) of the quadrupole mass spectrometer 34 is 2 Pa and thus the degree of vacuum (pressure) of the tested-body chamber 21 reached 10$^{-1}$ Pa order or less after 10 seconds from starting of the evacuation by the vacuum pump 23-b having a huge pumping speed, it was possible to start leakage inspection. That is, it was understood that the leakage inspection can be performed, as the earliest, after 20 seconds or later by using the apparatus according to the invention.

The vacuum evacuation time is approximately equivalent to the vacuum evacuation time in the conventional gas leak test. Furthermore, the measuring time of the probe medium with the quadrupole mass spectrometer 34 was about 20 seconds and a required time to finish the inspection from starting of the vacuum evacuation was 40 seconds. Accordingly, inspection of a large number of parts can be performed within a short time similar to the gas leak test method by using the apparatus according to the present invention.

Note that, when a quadrupole mass spectrometer having high, sensitivity and having a minimum detectable partial, pressure of 10$^{-13}$ Pa is used, the maximum available degree of vacuum (pressure) is 10$^{-2}$ Pa. Accordingly, although it is necessary to set the evacuation time by the vacuum pump 23-b having huge pumping speed to be about 1 minute, total inspection time is about 1 minute and 30 seconds and inspection time of high throughput of a certain level can be ensured.

In the above mentioned high pressure leakage inspection apparatus shown in FIG. 1, helium gas was used as the probe medium, the applied pressure to the helium gas was set to foe any in the range of 0.2 to 200 MPa and tested body whose flow rate of leakage $Q_{He}$ was set to be any in the range of $1 \times 10^{-8}$ to $1 \times 10^{-2}$ Pam$^3$s$^{-1}$ was prepared at first.

Next, the probe liquid was supplied to the tested body whose flow rate of leakage was adjusted under each applied pressure and pressure was applied to perform leakage inspection of the tested body. Table 3 illustrates a result of the leakage inspection by the apparatus according to the present invention when the applied pressure to the probe liquid was set within the range of 0.2 to 200 MPa and the flow rate of leakage from the tested body was set to be $1\times10^{-8}$ to $1\times10^{-2}$ $Pam^3s^{-1}$ in helium gas equivalent for each applied pressure. Mote that, effective pumping speed to the inspection chamber 31 when no differential evacuation is executed was set to be $1.0\times10^{-1}$ $m^3s^{-1}$.

TABLE 3

Result of Leakage Inspection When Probe Liquid is Methanol

| Flow rate of leakage (helium equivalent) | Pressure applied to methanol P (MPA) | | | |
|---|---|---|---|---|
| $Q_{He}$ $(Pam^3s^{-1})$ | 0.2 | 2 | 20 | 200 |
| $1\times10^{-8}$ | o | o | x | |
| $1\times10^{-7}$ | o | o | o | x |
| $1\times10^{-5}$ | o | o | o | o |
| $1\times10^{-3}$ | o (Differential evacuation)*[1] | o | o | o |
| $1\times10^{-2}$ | o (Differential evacuation) | o (Differential evacuation) | o | o |

*[1]Differential evacuation: Evacuation was performed by vacuum pump of the tested-body chamber having huge pumping speed of 1 $m^3s^{-1}$ during inspection and the effective pumping speed to the inspection chamber was set to be $1.0 \times 10^{-2}$ $m^3s^{-1}$ to perform inspection.

It is understood, that the leakage inspection was possible except the case where applied pressure to the probe liquid is a high pressure and flow rate of leakage in helium equivalent is small. Hereinafter, the result shown in Table 3 will be explained.

When the flow rate of leakage in helium conversion was $1\times10^{-8}$ $Pam^3s^{-1}$ in each applied pressure, leakage inspection was possible using the probe liquid when the applied pressure to the probe liquid was 0.2 MPa and 2 MPa.

On the other hand, the flow rate of leakage in helium equivalent was made to be $1\times10^{-8}$ $Pam^3s^{-1}$ by increasing the applied pressure corresponds to reducing of the size of the leak hole. Thus, the leakage amount became no more than the detectable partial pressure of the quadrupole mass spectrometer to be used when the applied pressure to the probe liquid was 20 MPa or more, so that leakage inspection using the probe liquid was impossible.

Furthermore, when the flow rate of leakage was $1\times10^{-7}$ $Pam^3s^{-1}$, inspection was possible up to 20 MPa but was impossible at 200 MPa. Note that, in the working example, a quadrupole mass spectrometer having a minimum detectable separate pressure of $1.0\times10^{-7}$ Pa was used, so that the result was obtained. However, when a high sensitive quadrupole mass spectrometer having a minimum detectable separate pressure of $10^{-13}$ Pa is used, it is obvious that leakage inspection is possible even for a still lower flow rate of leakage under a high applied pressure.

Next, when the flow rate of leakage is large at each applied pressure, it is obvious from Table 3 that the inspection is possible without problems. Among the results, when the applied pressure was low and the flow rate of leakage was large, that is, when the applied pressure was 0.2 MPa and the flow rate of leakage was $1\times10^{-3}$ $Pam^3s^{-1}$ or more in helium equivalent and when the applied pressure was 2 MPa and the flow rate of leakage was $1\times10^{-2}$ $Pam^3s^{-1}$ in helium equivalent, leakage amount of the probe liquid from the leak hole of the tested body became large. Due to this, the degree of vacuum (pressure) of the inspection chamber 31 becomes $1\times10^{-1}$ Pa or more by the vacuum evacuation using only the vacuum pump 32 of the inspection chamber 31. From these, it was understood that it is desirable to keep the inspection chamber at a degree of vacuum (pressure) of $10^{-3}$ Pa order or less and protect the quadrupole mass spectrometer 34 for inspection by performing so called differential evacuation in which evacuation is performed with the vacuum pump of the tested-body chamber having a huge pumping speed of 1 $m^3s^{-1}$ and evacuation is performed with the effective pumping speed to the inspection chamber set to be $1\times10^{-2}$ $m^3s^{-1}$.

When the procedure of the inspection was executed again after a large amount of flow rate of leakage was inspected, the methanol having leaked by a large amount during the last inspection remained in the tested-body chamber 21 in spite of no leakage from the tested body and was unfortunately measured as a background. When the allowable flow rate of leakage is $10^{-8}$ $Pam^3s^{-1}$ or more, the background is no problem but becomes a problem in the inspection whose allowable flow rate is therebelow.

In order to avoid the problem, the tested-body chamber 21 was heated op to 60° C. which is the temperature near the boiling point of methanol under atmospheric pressure by hot air baking when the tested body was exchanged. Then, when the inspection was performed again, it was possible to reduce the background to the level at which the background can be hardly measured. From the result, when the inspection is sequentially performed with respect to a number of parts and there is actually a large amount of leakage from the tested bodies, it is desirable to provide a step of heating the tested-body chamber up to about the boiling point of the probe liquid before the next inspection.

Working Example 2

A liquid medium in which a probe gas having small activation energy for desorption is dissolved may be used as a method for avoiding the problem that it takes a lot of time for the next inspection due to remaining probe liquid after a large amount of leakage is generated by the inspection. The liquid medium in which a probe gas is dissolved includes carbonic acid water, hydrogen peroxide water, ammonia water, etc. Hereinafter, an example of the case where carbonic acid water was used as the liquid medium in which a probe gas is dissolved will be described.

Considering that the solubility of carbon dioxide in water at normal temperature (25° C.) under one atmospheric pressure is $3.9\times10^{-2}$ $molL^{-1}$ which is a low value, carbonic acid water, as a liquid medium in which a probe gas is dissolved, was prepared in which carbon dioxide was dissolved in water under a high pressure of 0.7 MPa and which has a concentration of $2.73\times10^{-1}$ $molL^{-1}$, in order to facilitate the inspection using a quadrupole mass spectrometer.

The high pressure liquid leakage inspection apparatus illustrated in FIG. 1 was used for the leakage inspection. In order to detect the carbon dioxide dissolved in water, a high sensitivity quadrupole mass spectrometer of an electron multiplier type having a minimum detectable partial pressure of $10^{-13}$ Pa was used as the quadrupole mass spectrometer 34.

A tested body whose flow rate $Q_{He}$ of leakage is set to be any in the range from $1\times10^{-8}$ to $1\times10^{-2}$ $Pam^3s^{-1}$ was prepared in a similar manner as Working Example 1, the above carbonic acid water was supplied under each applied pressure and pressure was applied and then leakage inspection of the tested body was performed. Table 4 illustrates a result of the leakage inspection using the apparatus according to the present invention when the applied pressure to the carbonic acid water was set to be within the range of 1.0 to 20 MPa and the flow rate of leakage from the tested body was set to be $1\times10^{-8}$ to $1\times10^{-2}$ $Pam^3s^{-1}$ in helium gas equivalent for each applied pressure.

TABLE 4

Result of Leakage Inspection When Probe Medium is Carbonic acid Water

| Flow rate of leakage (helium equivalent) $Q_{He}$ ($Pam^3s^{-1}$) | Pressure applied to carbonic acid water P (MPA) | | | |
|---|---|---|---|---|
| | 1 | 2 | 20 | 200 |
| $1\times10^{-8}$ | ○ | ○ | Δ*1 | x |
| $1\times10^{-7}$ | ○ | ○ | ○ | Δ |
| $1\times10^{-5}$ | ○ (Differential evacuation)*2 | ○ | ○ | ○ |
| $1\times10^{-3}$ | ○ (Differential evacuation) | ○ (Differential evacuation) | ○ | ○ |
| $1\times10^{-2}$ | ○ (Differential evacuation) | ○ (Differential evacuation) | ○ (Differential evacuation) | ○ |

*1Δ: Inspection with the quadrupole mass spectrometer was possible but a long time was required for vacuuming to start inspection.
*2Differential evacuation: Evacuation was performed by vacuum pump having huge pumping speed of 1 $m^3s^{-1}$ of the tested-body chamber during inspection and effective exhaust velocity to the inspection chamber was set to be $1.0 \times 10^{-2}$ $m^3s^{-1}$ to perform inspection.

The leakage inspection was possible except when the flow rate of leakage $Q_{He}$ from the tested body is $1\times10^{-8}$ $Pam^3s^{-1}$ and the pressure applied to the carbonic acid water is 200 MPa. Herein, carbon dioxide (mass-to-charge ratio is 44) as dissolved probe gas was measured with the quadrupole mass spectrometer 34. Note that the inspection was possible when the flow rate of leakage $Q_{He}$ from the tested body was $1\times10^{-8}$ $Pam^3s^{-1}$ and the pressure applied to the carbonic acid water is 20 MPa and when the flow rate of leakage $Q_{He}$ from the tested body is $1\times10^{-7}$ $Pam^3s^{-1}$ and the pressure applied to the carbonate water is 200 MPa but it took about 2 hours for vacuum evacuation to start inspection, since the partial pressure of the carbon dioxide with the quadrupole mass spectrometer was $10^{-10}$ Pa order which is small.

The degree of vacuum (pressure) becomes no less than $10^{-3}$ Pa order which is the operation upper limit of the degree of vacuum (pressure) with the high sensitivity quadrupole mass spectrometer by the vacuum evacuation only with the vacuum pump of the inspection chamber in the area where leakage amount of the carbonic acid water which is a probe medium is large and applied pressure is low. Due to this, a differential evacuation was performed in which evacuation by the vacuum pump 23-b having a huge pumping speed of 1 $m^3s^{-1}$ of the tested-body chamber 21 is performed and the effective pumping speed to the inspection chamber 31 is set to be $1.0\times10^{-2}$ $m^3s^{-1}$ for evacuation.

When the procedure of inspection was performed again by using a tested body in which no leakage occurs after a large amount of flow rate of leakage was inspected, water which is a separated component of the carbonic acid water was measured but carbon dioxide which is a probe gas was not measured. According to the result, when a liquid medium in which a probe gas is dissolved is used, the problem can be solved that it takes a time to the next inspection due to the remaining probe medium after inspection of a large amount of leakage has been performed.

While examples of the embodiment of the present invention has been explained above, the present invention is not limited thereto but it goes without saying that various modifications are possible within the scope of the technical gist described in claims.

DESCRIPTION OF REFERENCE NUMERALS

1 liquid medium pressurizing and collecting system
2 tested body vacuum system
3 inspection chamber vacuum system
11 liquid supplying and pressurizing device
12 liquid pressurization line
13 collecting system
14 vacuum evacuation line
15 valve
16 valve
17 valve
18 valve
21 tested-body chamber
22-a vacuum valve
22-b roughing vacuum pump
23-a vacuum valve
23-b vacuum pump
24 vacuum valve
25 vacuum, gauge
26-a vacuum valve
26-b probe liquid standard leakage
27-a vacuum valve
27-b helium standard leakage
31 inspection chamber
32 vacuum pump
33 vacuum gauge
34 quadrupole mass spectrometer
35 conductance change mechanism

The invention claimed is:

1. A leakage inspection apparatus for inspecting a flow rate of leakage from a tested body, the apparatus comprising:
    a tested-body chamber for disposing the tested body therein, the tested-body chamber being able to be sealed;
    liquid supplying and pressurizing means that is connected to the tested body disposed in the tested-body chamber, the liquid supplying and pressurizing means supplying a probe liquid to the inside of the tested body and pressurizing the probe liquid;
    vacuum evacuation means; and
    a mass spectrometer connected to the tested-body chamber, wherein the tested-body chamber is evacuated by the vacuum evacuation means in a state where the tested-body chamber is sealed, the probe liquid is supplied to the inside of the tested body and pressurized to be 0.1 MPa or more, with the tested body being connected to the liquid supplying and pressurizing means and sealed, and the concentration of a probe medium having leaked from the tested body and having been evaporated in a vacuum is measured by the mass spectrometer, thereby measuring the flow rate of leakage from the tested body.

2. The leakage inspection apparatus according to claim 1, further comprising a probe liquid standard leakage for supplying a probe liquid to the tested-body chamber at a known flow rate of leakage.

3. The leakage inspection apparatus according to claim 1, wherein two or more systems of vacuum evacuation means are connected to the tested-body chamber via a vacuum valve.

4. The leakage inspection apparatus according to claim 1, wherein a vacuum gauge for measuring a degree of vacuum (pressure) in the tested-body chamber and the vacuum evacuation means are connected to the tested-body chamber, an inspection chamber is connected to the tested-body chamber via a vacuum valve and a mass spectrometer for measuring the concentration of the probe medium and vacuum evacuation means are connected to the inspection chamber.

5. The leakage inspection apparatus according to claim 1, wherein a liquid having a molecular mass of 500 or less, a solidification pressure of 1 MPa or more at a room temperature, an equilibrium vapor pressure of 100 Pa or more and an evaporative latent heat of 80 kJ·mol$^{-1}$ or less is used as the probe liquid.

6. The leakage inspection apparatus according to claim 1, wherein a probe medium in which a gas is dissolved in a solvent liquid is used as the probe liquid, the solvent liquid having a molecular mass of 500 or less, a solidification pressure of 1 MPa or more at a room temperature and an equilibrium vapor pressure of 100 Pa or more.

7. A leakage inspection method for inspecting a flow rate of leakage from a tested body disposed in a tested-body chamber that is sealed and that is evacuated by vacuum evacuation means,
the leakage inspection method comprising:
disposing the tested body in the tested-body chamber in a state where the tested body is connected to liquid supplying and pressurizing means and is sealed;
evacuating the tested-body chamber by the vacuum evacuation means in a state where the tested-body chamber is sealed;
supplying a probe liquid to the inside of the tested body disposed in the tested-body chamber and pressurizing the probe liquid to be 0.1 MPa or more by the liquid supplying and pressurizing means; and
measuring the concentration of a probe medium having leaked from the tested body and having been evaporated in a vacuum with a mass spectrometer, thereby measuring the flow rate of leakage from the tested body.

8. The leakage inspection method according to claim 7, wherein a probe liquid is supplied to the tested-body chamber at a known flow rate of leakage with a probe liquid standard leakage.

9. The leakage inspection method according to claim 7, wherein two or more systems of vacuum evacuation means are connected to the tested-body chamber via a vacuum valve for use.

10. The leakage inspection method according to claim 7, wherein a vacuum gauge for measuring a degree of vacuum (pressure) in the tested-body chamber and the vacuum evacuation means are connected to the tested-body chamber, an inspection chamber is connected to the tested-body chamber via a vacuum valve and a mass spectrometer for measuring the concentration of the probe medium and vacuum evacuation means are connected to the inspection chamber to be used.

11. The leakage inspection method according to claim 7, wherein a liquid having a molecular mass of 500 or less, a solidification pressure of 1 MPa or more at a room temperature, an equilibrium vapor pressure of 100 Pa or more and an evaporative latent heat of 80 kJ·mol$^{-1}$ or less is used as the probe liquid.

12. The leakage inspection method according to claim 7, wherein a probe medium in which a gas is dissolved in a solvent liquid is used as the probe liquid, the solvent liquid having a molecular mass of 500 or less, a solidification pressure of 1 MPa or more at a room temperature and an equilibrium vapor pressure of 100 Pa or more.

* * * * *